US011528156B2

(12) United States Patent
Liao

(10) Patent No.: US 11,528,156 B2
(45) Date of Patent: Dec. 13, 2022

(54) SECONDARY-STREAM DATA TRANSMISSION METHOD AND DISPLAY METHOD FOR USE IN CONFERENCE, CONFERENCE SYSTEM, AND PERIPHERAL DEVICE

(71) Applicant: YEALINK (XIAMEN) NETWORK TECHNOLOGY CO., LTD., Xiamen (CN)

(72) Inventor: Yun Liao, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 121 days.

(21) Appl. No.: 16/738,820

(22) Filed: Jan. 9, 2020

(65) Prior Publication Data

US 2020/0287735 A1    Sep. 10, 2020

(30) Foreign Application Priority Data

Mar. 8, 2019  (CN) .......................... 201910176987.5

(51) Int. Cl.
 *H04L 12/18* (2006.01)
 *H04L 65/403* (2022.01)
(52) U.S. Cl.
 CPC ...... *H04L 12/1822* (2013.01); *H04L 12/1818* (2013.01); *H04L 12/1827* (2013.01); *H04L 65/403* (2013.01)

(58) Field of Classification Search
 CPC . H04L 65/403; H04L 12/1822; G06F 3/1446; H04N 7/147; H04N 7/15; H04N 5/23293
 See application file for complete search history.

(56) References Cited

U.S. PATENT DOCUMENTS

| 9,270,941 | B1* | 2/2016 | Lavelle | .................. H04N 7/147 |
| 2015/0228088 | A1* | 8/2015 | Yoon | ..................... H04N 19/428 |
| | | | | 345/545 |
| 2016/0343355 | A1* | 11/2016 | Kim | ........................ G09G 5/006 |
| 2016/0357493 | A1* | 12/2016 | Zerwas | .................... G09G 5/12 |
| 2021/0336859 | A1* | 10/2021 | Beel | .................... H04L 65/4038 |
| 2022/0005374 | A1* | 1/2022 | Leahy | ...................... G09B 9/30 |

FOREIGN PATENT DOCUMENTS

CN          104412542 A      3/2015

* cited by examiner

*Primary Examiner* — Mahran Y Abu Roumi

(57) ABSTRACT

The present disclosure provides a secondary-stream data transmission method for use in a conference. An electronic device is communicatively connected to a peripheral device, and a virtual display apparatus and a virtual UAC device are virtualized on the electronic device. The virtual UAC device is configured to establish an audio data channel between the electronic device and the peripheral device, to obtain audio data. Image data is obtained from an output interface of a graphics card of the electronic device. If the image data needs to be transmitted to the virtual display apparatus, the image data, or the image data and the audio data are transmitted to the peripheral device, and are transmitted to the outside by the peripheral device. The present disclosure can not only implement compatibility of cross-platform operating systems, but also support different display modes such as duplication and extension.

8 Claims, 3 Drawing Sheets

SECONDARY-STREAM DATA TRANSMISSION METHOD AND DISPLAY METHOD FOR USE IN CONFERENCE, CONFERENCE SYSTEM, AND PERIPHERAL DEVICE

RELATED APPLICATION

This application claims priority to Chinese Application Number 201910176987.5, filed on Mar. 8, 2019, which is herein incorporated by reference.

BACKGROUND

Technical Field

The present disclosure belongs to the field of video conference technologies, and in particular, to a secondary-stream data transmission method and display method for use in a conference, a conference system, and a peripheral device.

RELATED ART

In a conference, project content displayed on devices such as a computer usually needs to be projected to a screen for presentation, or the display content needs to be transmitted to a remote end by using a remote video conference device. A common method is to transmit audio and video signals to an external display screen or a video conference device through a display output interface (such as VGA, a DVI, an HDMI, and a Display Port) of the computer in a wired manner. However, because video output interfaces of computers are not uniform, different computers may be configured with different video output interfaces, and a conference projection device or a secondary stream transmission device needs to be equipped with different interfaces or connecting lines to be compatible with different computers. This leads to a lot of connecting lines on the desktop, makes the deployment difficult, and causes a waste of costs. Therefore, it is a valuable solution to output shared content of the conference by using a wireless transmission method through a unified standard interface. The deployment of connecting lines of users are simplified, and at the same time, it can also get rid of the audio and video cables, so that the users can access and move freely in a wireless signal coverage area, which can bring better conference experience.

So far, wireless display technologies have been developed for many years. Developments of different wireless display technologies are promoted by a lot of big IT device manufacturers and chip manufacturers internationally. For example, an Intel wireless display (WiDi) wireless high-definition display technology led by Intel, an Airplay wireless display technology put forward by Apple Inc., and a Miracast technology led by WiFi Alliance are all wireless display technologies for transmitting compressed image data based on a WiFi direct technology. In addition, there are other wireless display technologies for transmitting non-compressed images by using higher frequency bandwidth, for example, a Wireless HD technology, a WHDI technology, and a lossless wireless transmission aimed at replacing the HDMI for high-definition video transmission. In these technologies, the compressed wireless display technology and the non-compressed wireless display technology both have advantages and disadvantages. Images in a non-compressed wireless display scheme have high fidelity, but have a large transmission data volume. Such technologies are mainly innovative technologies in an aspect of broadband, high-speed, low latency wireless transmission, and basically transmission is performed based on a dedicated wireless network. Relatively speaking, a compressed wireless display scheme may have a loss in image quality, but is advantageous when used in wireless transmission; this scheme includes a smaller data transmission volume, and may be implemented based on a universal WiFi technology.

However, the three WiFi-based wireless display standards: the Intel wireless display (WiDi) wireless high-definition display technology led by Intel, the Airplay wireless display technology put forward by Apple Inc., and the Miracast technology led by WiFi Alliance, are all technical standards applied to specific environment or devices. For example, WiDi needs to be implemented on a specific hardware platform or operating system of Intel. Airplay is only supported by Apple devices. In a Windows system, because a Miracast standard is based on a WiDi core protocol, a hardware requirement of Miracast technology is the same as a hardware requirement of WiDi. Therefore, the three wireless display technologies have limitation in a conference application. As shared devices, there is a defect of insufficient compatibility. These technologies have low connection efficiency and poor user experience in the conference application.

In a patent document, which is filed by Barco N. V. in Belgium with a published application number CN 104412542 A and entitled "ELECTRONIC TOOL AND METHOD FOR MEETING", an electronic conference tool and a method for transmitting any media content from attended users are disclosed. The technical solution is to construct a dedicated tool used for wireless display transmission. The tool has a transmitting end and a receiving end. The transmitting end is connected to a USB peripheral device of a computer, and is provided with a built-in computer program and a wireless transmission module. When inserted in the computer, the peripheral device automatically runs the program. The program grabs image content displayed on a computer desktop and audio data, compresses the image content and the audio data, and then transmits the compressed image content and audio data to the receiving end through the wireless transmission module. The receiving end decodes and displays video images, and plays audio. This technical solution reduces requirements on hardware and systems and can run on both Windows and MAC OS. A wireless network is automatically established. Therefore, the connection does not need to be configured each time when a user uses the tool, thus implementing plug-and-play. The wireless transmitting end and receiving end are automatically connected, thereby significantly improving user experience. However, because it is necessary to grab and compress images displayed on a computer desktop based on a computer application program, more CPU performance of the computer needs to be consumed, and content grabbed and transmitted can only be the content displayed on the computer desktop, that is, display is based on duplication or screenshot, and extended display cannot be implemented.

In addition, in a conference system, the content of the computer desktop is usually shared by using a network connection manner. This scheme is implemented using the following method: a computer that needs to be shared and a conference terminal connected to a display device are both connected to an IP network and communicate with each other. The computer side runs a client program and grabs display content of the desktop for image encoding and compression. The content is transmitted to the conference terminal through the IP network, or is transmitted to a server of a terminal, and is forwarded to the receiving end by the server with or without processing. The receiving end decodes a secondary-stream image, and outputs the image for display. Although this technical solution does not need an extra hardware peripheral device, a specific application needs to be installed on the computer, and connection to the IP network is needed. In use, a user needs to ensure that the connection to the IP network has been established and run the application program manually, which adversely affects the user experience. This solution is the same as the technical scheme of Barco N.V. in Belgium. It is necessary to grab and compress images displayed on a computer desktop based on a computer application program, which needs to consume more CPU performance of the computer, and content grabbed and transmitted can only be the content displayed on the computer desktop, that is, display is based on duplication or screenshot, and extended display cannot be implemented.

SUMMARY

In diagram of problems in the prior art, an objective of the present disclosure is to provide a secondary-stream data transmission method for use in a conference, where encoding is accelerated by using hardware of a graphics card, so that CPU usage is greatly reduced.

In the secondary-stream data transmission method for use in a conference provided in the present disclosure, an electronic device is communicatively connected to a peripheral device, and a virtual display apparatus and a virtual UAC device are virtualized on the electronic device. The virtual UAC device is configured to establish an audio data channel between the electronic device and the peripheral device, to obtain audio data. Image data is obtained from an output interface of a graphics card of the electronic device. If the image data needs to be transmitted to the virtual display apparatus, the image data, or the image data and the audio data are transmitted to the peripheral device, and are transmitted to the outside by the peripheral device, that is, transmitted to other devices in addition to the electronic device, the virtual display apparatus, and the virtual UAC device.

The present disclosure provides a virtual display apparatus on an electronic device, so that a user may implement duplication and extension of a screen by using the virtual display apparatus. When an operation such as duplication or extension is selected, in the present disclosure, image data is directly obtained from a graphics card of the electronic device. The image data is redirected to a peripheral device, that is, the image data is transmitted to the peripheral device, and is then transmitted to the outside by the peripheral device, thereby implementing transmission of secondary-stream data. Because the data is directly obtained from the graphics card, and the data is processed by using hardware of the graphics card, CPU usage is greatly reduced. In the present disclosure, a virtual UAC device is further virtualized, which follows a UAC standard of a computer operating system, and is configured to establish an audio playing and transmitting channel with the computer, to obtain a UAC audio data stream provided by the system. The electronic device described in the present disclosure may be a computer, a tablet computer, or the like. The peripheral device in the present disclosure may be plugged into the electronic device by using a USB interface to implement transmission of data. The USB interface may further be used to supply power. It should be noted that the peripheral device may also be connected to the electronic device in other manners, for example, a wireless communications manner. The electronic device in the present disclosure may be a device such as a desktop computer, a laptop, or a PAD. The display device may be a device such as a television, a desktop computer, a notebook computer, a PAD, or a projector. In the present disclosure, data is transmitted by using the peripheral device, and data of the electronic device is transmitted to other devices (which do not refer to the virtual display apparatus), thereby implementing compatibility between different systems.

Preferably, the image data transmitted by the peripheral device is compressed data, and the image data is compressed by the graphics card. A data volume transmitted in a wireless manner is reduced by compressing data. Usually, the format of compressing may be H. 264, MJPEG, H. 265, or the like. Image latency is also reduced. In the present disclosure, data is compressed by using the graphics card, thus further reducing the CPU usage.

Preferably, an encoding and transmission mode based on differences between partial areas of dynamic images is used in the present disclosure. If two successive image frames only have changed display content in a partial area, the data obtained from the graphics card is the changed display content of the partial area. Time for encoding and transmission is further reduced. A complete displayed image is decoded and re-constructed in a receiving and processing end, which effectively alleviates a sense of hysteresis when a mouse is moved on a static image.

Preferably, the peripheral device performs transmission over a wireless network, thereby avoiding chaos caused by connecting cables.

The present disclosure further provides a secondary-stream data display method for use in a conference, implemented by using the secondary-stream data transmission method for use in a conference provided in the present disclosure. A peripheral device is communicatively connected to a receiving and processing end. After the receiving and processing end obtains data transmitted by the peripheral device, the data is displayed on a display device, or the data is transmitted by the receiving and processing end to a second peripheral device, is transmitted by the second peripheral device to a second electronic device, and is displayed on the second electronic device.

Preferably, the peripheral device and/or the second peripheral device is first paired with and connected to the receiving and processing end, and the data is transmitted only after the pairing and connection succeed.

Preferably, after the receiving and processing end obtains the data transmitted by the peripheral device, the data is transmitted to a remote receiving and processing end, and is displayed on a remote display device, or the data is transmitted by the remote receiving and processing end to a remote peripheral device, is transmitted by the remote peripheral device to a remote electronic device, and is displayed on the remote electronic device.

The present disclosure further provides a conference system, including an electronic device, a peripheral device, a receiving and processing end, and a display device. The conference system implements display of secondary-stream data by using the secondary-stream data display method for use in a conference provided in the present disclosure.

The present disclosure further provides a conference system, including an electronic device, a peripheral device, a receiving and processing end, a display device, a remote electronic device, a remote peripheral device, a remote receiving and processing end, and a remote display device.

The conference system implements display of secondary-stream data by using the secondary-stream data display method for use in a conference provided in the present disclosure.

The present disclosure further provides a peripheral device, including a wireless transmission module, a UAC module, and a storage module. The storage module stores a program that implements the secondary-stream data transmission method for use in a conference provided in the present disclosure.

The present disclosure has the following beneficial effects:

(1) The secondary stream transmission method for use in a conference in the present disclosure can not only implement the compatibility of cross-platform operating systems, but also support different display modes such as duplication and extension.

(2) In the secondary stream transmission method for use in a conference in the present disclosure, encoding is accelerated by using the hardware of the graphics card in a system layer, which can greatly reduce the CPU usage compared with a common manner of encoding and transmission by grabbing screen display though application software.

DETAILED DESCRIPTION

Terms used in the present disclosure are defined as follows.

1. Wireless secondary stream: in a local or remote video conference, a display interface or content on a computer is projected on a large screen, or transmitted to a remote end for sharing, where the shared content is defined as a secondary stream, which means an auxiliary video stream. A secondary stream shared in a wireless manner is called a wireless secondary stream.

2. UAC, which is short for USB audio class, is a USB transmission protocol in a system layer.

3. VDI is short for virtual desktop infrastructure. An operating system runs in a server of a data center, to virtualize a computer desktop. Storage and computing are both performed in the server of the data center. Users are connected to a virtual desktop though a protocol of a client device. Therefore, for the users, accessing their desktop is just like accessing a local desktop of a conventional computer.

To implement wireless secondary-stream data transmission provided in the present disclosure, three core components are needed.

Figure 1:
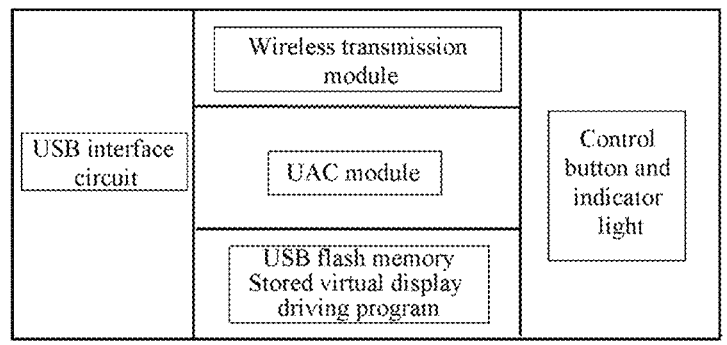
FIG. 1 is a functional structural diagram of a USB peripheral device according to the present disclosure.

1. A hardware peripheral device connected to a computer when used: The computer described in the present disclosure not only includes a desktop computer and a notebook computer, but also includes electronic devices such as a mobile phone terminal and a tablet computer. As shown in FIG. 1, the hardware peripheral device provided in the present disclosure is a USB peripheral device, which is connected to devices such as a computer by using a USB interface circuit, or may implement connection to devices such as a computer by using other known interfaces. The USB peripheral device includes the USB interface circuit, a wireless transmission module, a USB flash module, a UAC functional module, a control button, and an indicator light. (1) The USB peripheral device has one or more USB interfaces, and may be connected to a plurality of computers simultaneously when provided with a plurality of USB interfaces. (2) The built-in wireless transmission module can be automatically connected to a pre-paired receiving end after powered on for operation, and is configured to transmit audio and image data. (3) If the USB peripheral device needs to store a built-in driving program, the USB flash module is needed. However, a function of USB flash module can be logically closed, and be used as an optional functional module, because it is not mandatory to store the driving program on the USB peripheral device. The driving program may be downloaded from a receiving and processing end of connected display device by using the built-in wireless transmission module. Alternatively, installation of the driving program may be completed in other manners. (4) The UAC functional module is a USB audio class driving program module running on the USB peripheral device. The functional module follows a UAC standard of a computer operating system, and is configured to establish an audio playing and transmission channel with the computer. (5) The control button allows a user to start or stop transmission of the secondary stream, and presents different working states through the indicator light.

2. A USB virtual display driver installed in a computer: The USB virtual display driver needs to be installed on the computer when used for the first time. A driving program installation document may be stored in the hardware peripheral device, or may be downloaded from the receiving and processing end of connected display device by using the wireless transmission module built in the hardware peripheral device. Alternatively, the driving program is obtained and installed in other manners, for example, directly downloaded and installed by the computer through the Internet. The installed USB virtual display driving program resides on the operating system of the computer. When used next time, the program does not need to be installed again. A virtual display driver shares and uses processing capability of a real physical graphics card of the computer, establishes a logical reflection of a physical GPU based on an application layer interface virtualization technology, intercepts an GPU-related application programming interface in an application layer, and re-directs the displayed image data to a USB interface, to establish a USB data channel of a virtual display device.

Figure 5:
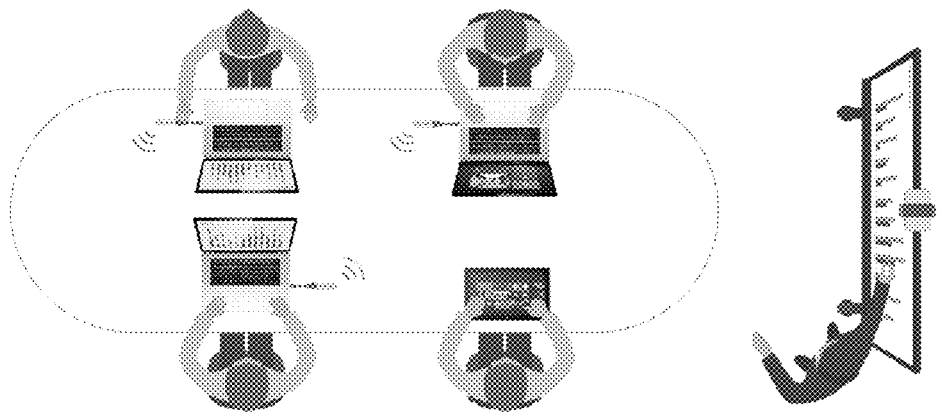
FIG. 5 is a schematic diagram 2 of application of a typical scenario according to the present disclosure.

3. A receiving and processing end: The receiving and processing end is configured to receive audio and video data transmitted by the USB peripheral device, and then transmit the data to a remote end or output the data to a display device after processing the data. However, the display device is not limited to a locally connected display device. Alternatively, the data may be transmitted to the remote end though network transmission for display. The receiving and processing end has a function or a module used as a wireless transmission host, and can be simultaneously connected to a plurality of hardware peripheral devices. The connection refers to a wireless connection, and may be any connection technology capable of transmitting audio and video data, for example, a wireless local area network (WLAN), wireless fidelity (WiFi), a WiFi direct connection (WiFi Direct)

technology, a wireless home digital interface (WHDI), or any other wireless transmission network known by a person skilled in the art. Generally, the receiving and processing end of the wireless secondary stream is integrated in a video conference terminal. FIG. 5 shows an application scenario in which a plurality of hardware peripheral devices is connected simultaneously. Three notebook computers and one display device are shown in the figure (the receiving and processing end may be integrated in the display device, or may be set as an independent device). One of the three notebook computers shares an icon to the display device by using the USB peripheral device, and the icon is displayed on the display device. At the same time, the display device (which integrates the receiving and processing end) shares the icon to the other two notebook computers, and the icon is displayed on the other two notebook computers synchronously.

Figure 3:
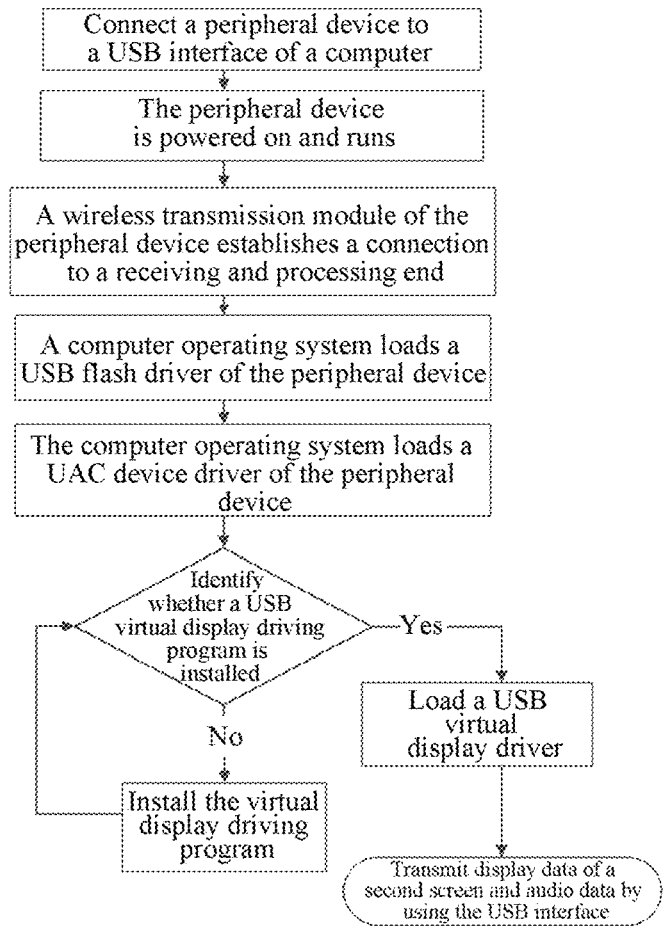
FIG. 3 is a working flowchart of a wireless secondary stream transmission according to the present disclosure.

The peripheral device in the present disclosure is a plug-and-play device powered depending on a USB interface of a computer. For security, before use, the peripheral device needs to be paired with and connected to the receiving and processing end in advance. The purpose of pairing and connection is to preset wireless connection information. For example, when transmission is performed based on WiFi, a WiFi AP SSID and a password of the receiving and processing end are written in the peripheral device in advance. FIG. 3 is a working flowchart of a peripheral device. When the peripheral device is inserted in a USB interface of a computer, the peripheral device is powered on and automatically runs. The peripheral device establishes a wireless connection with the receiving and processing end of the peripheral device by using a wireless transmission module. In this case, a USB driver of the computer completes loading of USB flash memory and UAC device of the peripheral device. If there is no flash memory module in the peripheral device, the USB flash memory may not be loaded on the computer. The peripheral device waits for connection information of a virtual display driving program of the computer. If the virtual display driving program is not installed on the computer, a user needs to run the virtual display driving program manually or allow a virtual display driving program installation program in the USB flash memory to run automatically. Alternatively, the virtual display driving program may be installed on the computer in other manners in advance. After the program is installed, an application service resides on a background of the computer, to detect whether the peripheral device is connected to the computer. If it is detected that the peripheral device has been correctly connected, the residing service program in the background runs the USB virtual display driving program, and an extra display device connected is loaded and displayed on the computer operating system. A user may set a display mode as if a VGA or an HDMI display device is connected. For example, a duplication mode or an extension mode can be switched, and a display image of a second screen and an audio signal are transmitted by using a USB interface. In computer direct display, a displayed initial image signal is output by using a built-in display screen or image display interfaces such as an HDMI, a VGA, a DVI, and a mini DP. Different from the computer direct display, the virtual display driver in the present disclosure is an indirect display mode, in which compressed image data is transmitted by using the USB interface, with an objective to reduce a data volume transmitted in a wireless manner. Usually, the format of compressing may be H.264, MJPEG, H.265, or the like. To reduce image latency, the virtual display driver only compresses and encodes the displayed image content of a changed part in a case where only content displayed in a partial changes. Time for encoding and transmission is further reduced, and a complete displayed image is decoded and re-constructed in a receiving and processing end, which effectively alleviates a sense of hysteresis when a mouse is moved on a static image. In the present disclosure, the image data is compressed by using GPU hardware of a graphics card, and may not be compressed by using software, which greatly reduces CPU usage.

Figure 2:
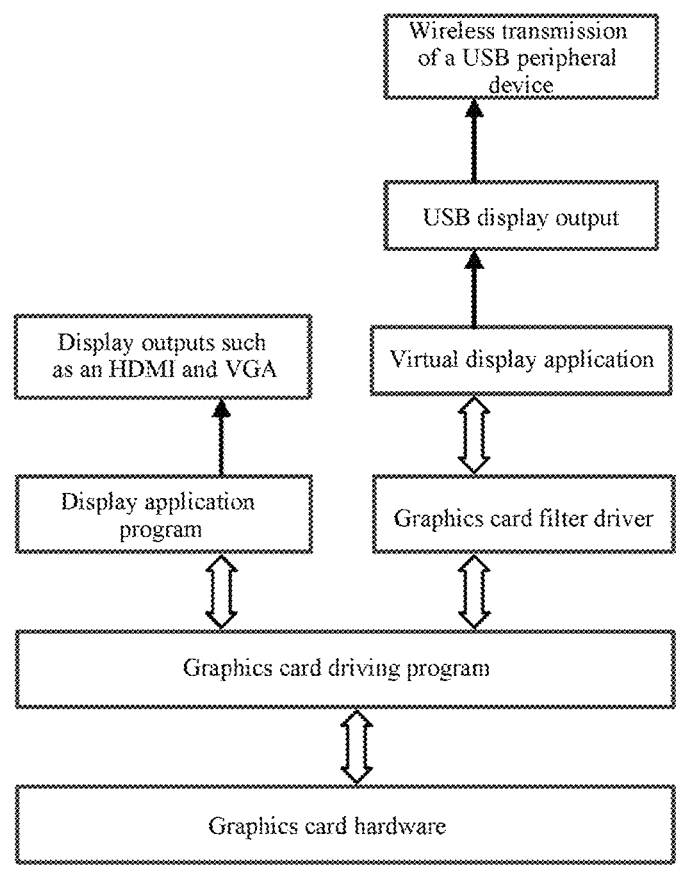
FIG. 2 is a topological structural diagram of virtual display according to the present disclosure.

FIG. 2 is a topological structural diagram of virtual display according to the present disclosure. An initial direct display application program and a virtual display application program simultaneously run on a graphics card driving program. The "direct display" is relative to the "virtual display" described in the present disclosure. The "virtual display" is an indirect display mode. An implementation principle is to add a graphics card filter driver on the initial graphics card driving program, to intercept various requests and data of the graphics card, and "disguise" the USB peripheral device as a display. The virtual display application delivers a display command request by using the graphics card filter driver, and obtains the display data.

Figure 4:
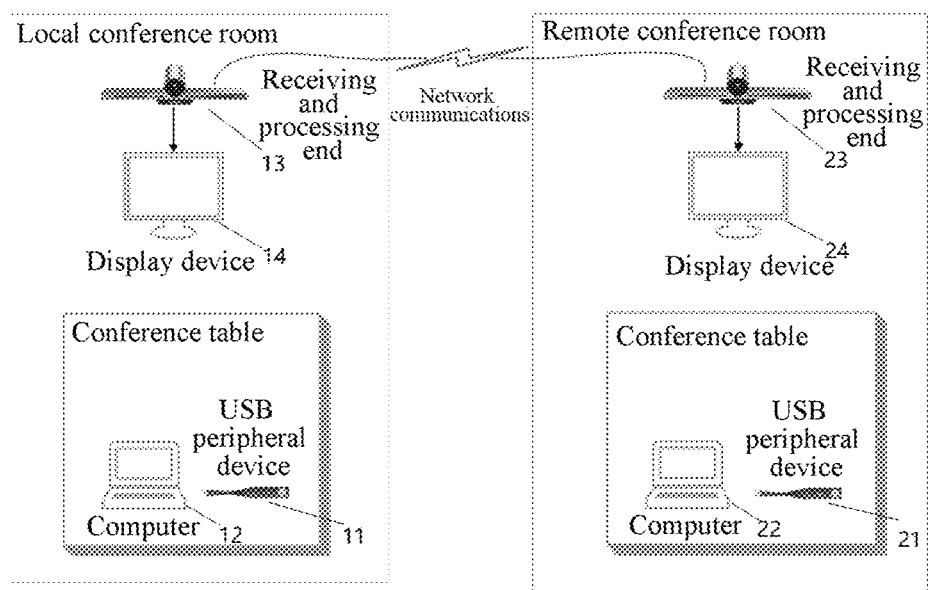
FIG. 4 is a schematic diagram 1 of application of a typical scenario according to the present disclosure.

A connection diagram shown in FIG. 4 shows a typical application scenario according to the present disclosure. A receiving and processing end 13 of a local conference room is connected to a display device 14. A computer 12 on a conference table installs a USB virtual display driver. After connected to the computer and running, a USB peripheral device 11 loads the driver. It is identified on a computer operating system that a display and a UAC device are connected. After a user begins to operate and transmit a secondary stream, the USB peripheral device obtains, by using a USB interface, UAC audio and video data streams provided by a system, and a compressed display image data stream provided by a USB virtual graphics card program. The USB peripheral device 11 transmits the audio and video data streams and the image data stream to a receiving and processing end 13 by using a wireless transmission module. The receiving and processing end 13 decodes image data, and the image data is displayed on the display device 14. If a transmitting end uses an encoding and transmission mode based on differences between partial areas of dynamic images, the receiving and processing end 13 needs to re-construct the image. In an actual application, it is not limited to local display. A conference system further includes a receiving and processing end 23, a display device 24, a computer 22, and a USB peripheral device 21 of a remote conference room. The receiving and processing end 13 of the local conference room may transmit wireless secondary-stream data to one or more receiving and processing ends 23 of the remote conference room in combination with a video conference communications system, and display the data by using the display device 24, or may display the data by using other devices, such as the computer 22, which are communicatively connected to the receiving and processing end 23. The local receiving and processing end 13 may also receive and display wireless secondary-stream data transmitted by a remote end.

What is claimed is:

1. A secondary-stream data transmission method for use in a conference, which is performed by an electronic device that is communicatively connected to a peripheral device, a virtual display apparatus, and a virtual UAC (USB (Universal Serial Bus) Audio Class) device, the virtual display apparatus and the virtual UAC device being virtualized on the electronic device, wherein the method comprises:

establishing, by the virtual UAC device, an audio data channel between the electronic device and the peripheral device, to obtain audio data; and obtaining image data from an output interface of a graphics card of the electronic device, wherein when the image data is transmitted to the virtual display apparatus, the image data, or the image data and the audio data are transmitted to the peripheral device, and are transmitted, by the peripheral device, to other devices in addition to the electronic device, the virtual display apparatus, and the virtual UAC device, wherein the virtual display apparatus includes a graphics card filter driver, which is added on an initial graphics card driving program, to intercept various requests and data of the graphics card and to use the peripheral device as a display, wherein when two successive image frames only have changed display content in a partial area, the image data obtained from the graphics card is the changed display content of the partial area, wherein the image data transmitted by the peripheral device is compressed data, and the image data is compressed by the graphics card, and wherein encoded data is directly obtained from the graphics card and then transmitted via USB, without displaying the encoded data on the electronic device.

2. The secondary-stream data transmission method for use in a conference according to claim 1, wherein the peripheral device performs transmission over a wireless network.

3. The secondary-stream data transmission method for use in a conference according to claim 1, wherein the peripheral device is communicatively connected to a receiving and processing end; and after the receiving and processing end obtains data transmitted by the peripheral device, the data is displayed on a display device, or the data is transmitted by the receiving and processing end to a second peripheral device, is transmitted by the second peripheral device to a second electronic device, and is displayed on the second electronic device.

4. The secondary-stream data transmission method for use in a conference according to claim 3, wherein the peripheral device and/or the second peripheral device are first paired with and connected to the receiving and processing end, and the data is transmitted only after the pairing and connection succeed.

5. The secondary-stream data transmission method for use in a conference according to claim 3, wherein after the receiving and processing end obtains the data transmitted by the peripheral device, the data is transmitted to a remote receiving and processing end, and is displayed on a remote display device, or the data is transmitted by the remote receiving and processing end to a remote peripheral device, is transmitted by the remote peripheral device to a remote electronic device, and is displayed on the remote electronic device.

6. A conference system comprising:
an electronic device;
a peripheral device communicatively connected to the electronic device;
a receiving and processing end communicatively connected to the peripheral device; and
a display device communicatively connected to the receiving and processing end, wherein the conference system implements display of secondary-stream data by using a secondary-stream data transmission method, wherein a virtual display apparatus and a virtual UAC (USB (Universal Serial Bus) Audio Class) device are virtualized on the electronic device, the virtual UAC device is configured to establish an audio data channel between the electronic device and the peripheral device, to obtain audio data, and image data is obtained from an output interface of a graphics card of the electronic device, wherein when the image data is transmitted to the virtual display apparatus, the image data, or the image data and the audio data are transmitted to the peripheral device, and are transmitted, by the peripheral device, to other devices in addition to the electronic device, the virtual display apparatus, and the virtual UAC device, wherein the virtual display apparatus includes a graphics card filter driver, which is added on an initial graphics card driving program, to intercept various requests and data of the graphics card and to use the peripheral device as a display, wherein after the receiving and processing end obtains data transmitted by the peripheral device, the data is displayed on the display device, or the data is transmitted by the receiving and processing end to a second peripheral device, is transmitted by the second peripheral device to a second electronic device, and is displayed on the second electronic device, wherein the image data transmitted by the peripheral device is compressed data, and the image data is compressed by the graphics card, and wherein encoded data is directly obtained from the graphics card and then transmitted via USB, without displaying the encoded data on the electronic device.

7. The conference system according to claim 6, further comprising a remote electronic device, a remote peripheral device, a remote receiving and processing end, and a remote display device, wherein after the receiving and processing end obtains the data transmitted by the peripheral device, the data is transmitted to the remote receiving and processing end, and is displayed on the remote display device, or the data is transmitted by the remote receiving and processing end to the remote peripheral device, is transmitted by the remote peripheral device to the remote electronic device, and is displayed on the remote electronic device.

8. The secondary-stream data transmission method for use in a conference according to claim 4, wherein after the receiving and processing end obtains the data transmitted by the peripheral device, the data is transmitted to a remote receiving and processing end, and is displayed on a remote display device, or the data is transmitted by the remote receiving and processing end to a remote peripheral device, is transmitted by the remote peripheral device to a remote electronic device, and is displayed on the remote electronic device.

* * * * *